United States Patent

[11] 3,609,318

[72] Inventor Eugene R. Anderson
Saratoga, Calif.

[21] Appl. No. 799,066
[22] Filed Feb. 13, 1969
[45] Patented Sept. 28, 1971
[73] Assignee Measurex Corporation
Santa Clara, Calif.

[54] DIGITAL CONTROL SYSTEM FOR SCANNING SHEET MATERIAL
8 Claims, 1 Drawing Fig.

[52] U.S. Cl. .................................................. 235/151.3, 73/73
[51] Int. Cl. .................................................. G06f 15/46
[50] Field of Search .................................................. 235/151.13, 150.3, 151.35, 151.3; 73/73

[56] References Cited

UNITED STATES PATENTS

| | | | |
|---|---|---|---|
| 3,073,153 | 1/1963 | Petitjean ...................... | 73/73 |
| 3,190,261 | 6/1965 | Ziffer .......................... | 118/8 |
| 3,471,685 | 10/1969 | Bishop.......................... | 235/151.3 X |

*Primary Examiner*—Eugene G. Botz
*Assistant Examiner*—Edward J. Wise
*Attorney*—Flehr, Hohbach, Test, Albritton & Herbert

ABSTRACT: Digital control system for scanning sheet material having provision for computer control, scanning head alignment error detection, control of scan increments, off-sheet demand and single-point positioning.

PATENTED SEP 28 1971 3,609,318
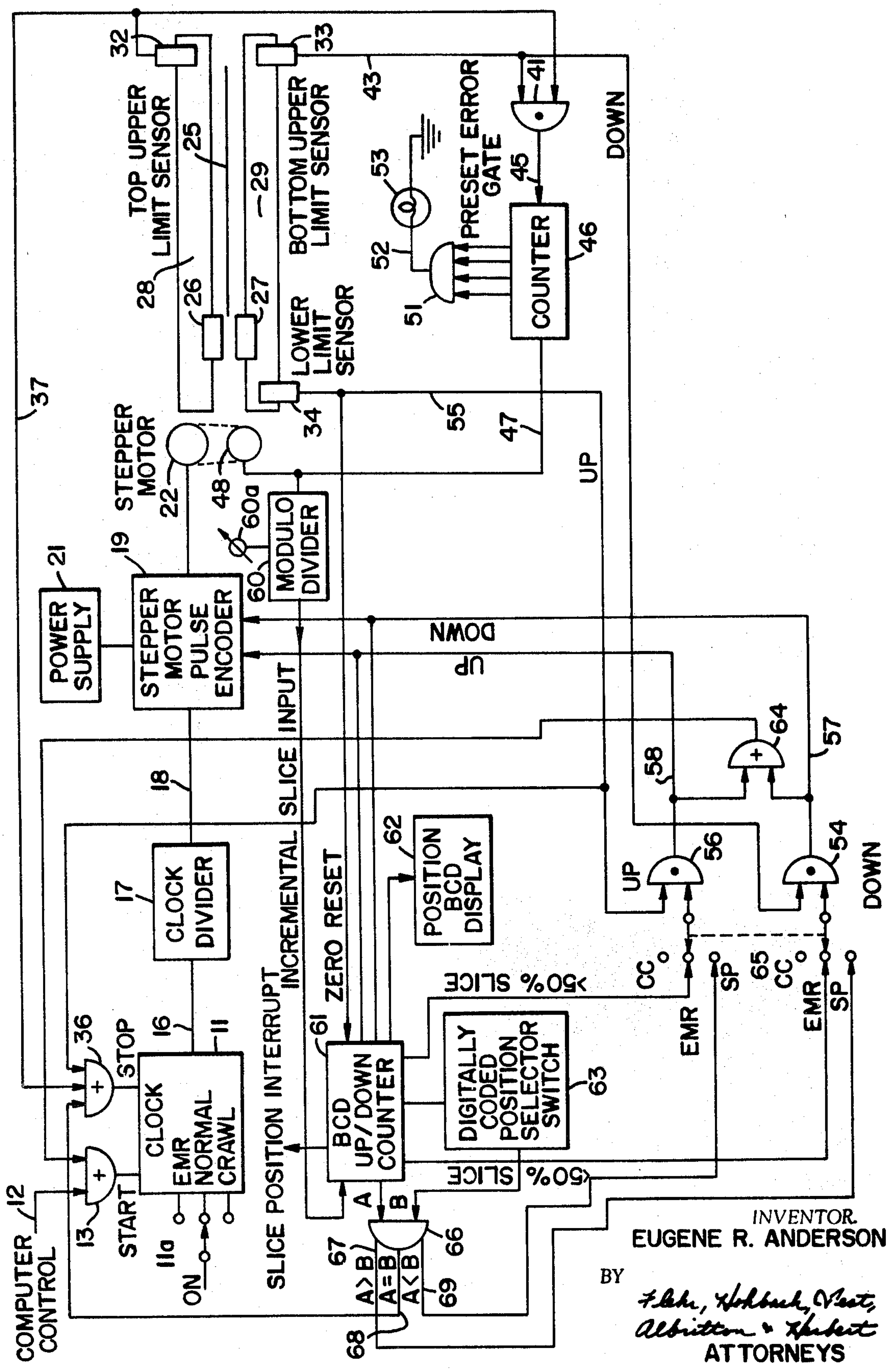
INVENTOR.
EUGENE R. ANDERSON
BY
Fehr, Hohbach, Test, Albritton & Herbert
ATTORNEYS

DIGITAL CONTROL SYSTEM FOR SCANNING SHEET MATERIAL

BACKGROUND OF THE INVENTION

Control systems have heretofore been provided for the scanning of sheet materials to obtain, for example, the basis weight of the material. Such scanning systems have been inflexible and not adapted for specific use for sheet material scanning. For example, it is desirable to indicate the location of a scanner of a paper machine as a fraction of the width or "-slice" of the paper. Prior systems have merely indicated linear distance.

It has also been difficult to detect misalignment between scanning heads. Moreover, prior systems have required costly servoloop drives. Finally with the greater use of computer control of systems, such prior systems have not been compatible with that type of control.

OBJECTS AND SUMMARY OF THE INVENTION

It is, therefore a general object of the invention to provide an improved control system for scanning sheet material which makes use of a simple logic system.

It is another object of the invention to provide a system as above which is flexible and adaptable to computer control.

Another object of the invention is to provide a control system of the above character in which the scanner location is indicated in accordance with the total slice or width of the sheet material.

Another object of the invention is to provide a control system of the above character in which the heads which are utilized for scanning are monitored to determine any misalignment.

In accordance with the above objects there is provided a digital control system for scanning sheet material, one edge of the sheet being proximate to a lower scan limit and the other edge proximate to an upper scan limit. The system comprises first and second scanning head means located in juxtaposition on opposed sides of the sheet material. Motor means are coupled to the head means for driving them across the sheet material at a predetermined speed. Means coupled to the motor means have an output signal with a pulse-repetition rate proportional to the speed of the head means. First and second limit sensor means sense the respective arrivals of the first and second scanning head means at one of the limits for producing respective indications of these arrivals. Counting means, driven at the pulse-repetition rate, are responsive to the arrival indication which is first in time to start to count and and then to the arrival indication last in time to stop counting whereby the count of the counter means represents the alignment error between the two head means.

Additionally, modulo-type divider means are provided for incrementing the linear distance between the upper and lower scan limits into a predetermined number of increments. Means coupled to and responsive to the modulo divider means indicate the increment of the sheet material being scanned by the head means.

BRIEF DESCRIPTION OF THE DRAWING

The drawing is a block diagram of a digital control system incorporating the present invention.

DESCRIPTION OF THE PREFERRED EMBODIMENT

The digital control system as shown in the drawing consists of a clock 11 which is designed to operate at a suitable predetermined frequency as, for example, 24 kHz. which is a frequency which is compatible with the speeds for driving the mechanism which is to be operated by the digital control system and which is compatible with the various gear ratios utilized in the mechanism. A computer control input 12 is connected to one of the inputs of an AND gate 13 which is connected to the clock 11. When there is a signal on line 12, the clock 11 is turned on which supplies its output frequency on a line 16 to a clock divider 17. The clock divider divides the frequency to provide a basic frequency which is the exact desired frequency to operate the mechanism which is to be controlled.

The output of the clock divider is supplied on a line 18 to a stepper motor pulse encoder 19 of a conventional type which drives a stepper motor 22. The pulse encoder 19 is provided with a power supply 21 and is activated by the train of pulses which is supplied on the line 18 from the clock divider. By way of example, the clock divider can divide down the frequency from the clock 11 by 128 to drive the stepper motor 22 at the desired speed. The stepper motor is of the type described in copending application Ser. No. 792,007 filed Jan. 17, 1969. As described in that copending application the stepper motor can form a part of a sheet-gauging apparatus and through the timing belt disclosed therein can drive gauging heads which are positioned on the opposite sides or on the same side of a sheet to scan a sheet laterally as the sheet is advanced through the gauging heads. By way of example, the belt timing system can be designated such so that with the 24 kHz. clock-frequency from the clock 11 divider down by 128 can provide a travel of the gauging heads of approximately 300 to 1,000 inches per minute. It can be seen that the clock divider 17 can be adjusted to divide down the basic clock frequency to drive the stepper motor 22 at a predetermined normal scanning rate.

As explained in the above copending application, the stepper motor 22 through a timing belt drive system drives in unison a pair of gauging heads 26 and 27 of a scanner which travel on spaced parallel horizontal beams 28 and 29. The sheet of paper 25 which is to be scanned or gauged moves between the two gauging heads 26 and 27 as they are moved on the beams 28 and 29. As also described in said copending application, means is provided for reversing the direction of movement of the gauging heads 26 and 27 and includes a top upper limit sensor 32 and a bottom upper limit sensor 33 both of which are positioned on the same end of each of the beams 28 and 29 and a lower limit sensor 34 which is positioned on the other end of the lower beam 29. The limit switches 32, 33 and 34 can be of any suitable type, for example, the vane-type switches disclosed in said copending application. As also disclosed therein, the gauging heads 26 and 27 carry vanes which when the gauging heads move to the ends of the beams 28 and 29 actuate the switches 32, 33 and 34. Thus, the upper limit switches or sensors 32 and 33 are proximate to one edge of sheet 25 to determine an upper scan limit and switch or sensor 34 is proximate to the other edge of sheet 25 to determine a lower scan limit.

Reversal of movement of heads 26 and 27 is provided by sensor 33 and 34. Sensor 33 is coupled by a line 43 to a "-down" OR gate 54. Sensor 34 is coupled by AND line to an "up" OR gate 56. Gates 54 and 56 have respective output lines 57 and 58 coupled to motor encoder 19 to control the direction of the scan movement.

Sensor 32 is connected to an AND gate 36 by lead 37 so that when the top gauging head 26 arrives at the right hand of the beam 28 as viewed in the drawing, the clock 11 is stopped which stops the movement of the gauging heads 26 and 27. Similarly, sensor 34 is coupled to gate 36 by a lead 55.

An output from the switch 32 is also supplied to one input of an exclusive OR gate 41 through a lead 42 and similarly the output of the switch 33 is supplied to the other input of the exclusive OR gate 41 by a lead 43. The output of exclusive OR gate 41 is supplied by a lead 45 to a counter 46. The clock rate of the counter 46 is determined by the pulses supplied on a line 47 from a pulse generator 48 which can be directly connected to a stepper motor 22 or connected thereto by belting to provide a pulse-repetition rate which is proportional to the linear speed of the gauging heads 26 and 27 as driven by the stepper motor 22. Alternately the pulses from pulse encoder 19 may be used since their pulse rate is by definition proportional to the speed of the scanning heads. The first pulse to arrive on lead 45 from either switch 32 or switch 33 depending on which is operated first will start the counter 46 and the second pulse to arrive on lead 45 will stop the counter 46. The second pulse is supplied by the last to be operated of the switches 32 and 33. The counter 46, therefore, determines the difference of time arrival between the gauging head 26 and the gauging head 27. In the event that the times of arrival of the gauging heads 26 and 27 are beyond predetermined reference tolerances which have been preset into the counting units forming a part of the counter 46 and connected to a preset error gate 51, a signal will be supplied from the output of the gate 51 to an output lead 52. Lead 52 is shown connected to a warning light 53 but can, in addition, be connected to other alarm devices (not shown) to indicate that the gauging heads are out of alignment by more than the allowable tolerances.

It can be seen that this method of checking the time of arrival of the upper and lower gauging heads 26 and 27 is independent of the velocity they are travelling since the pulse-repetition rate of the clock pulses driving the stepper motor 22 are proportional to the velocity of the gauging heads at the time they approach the limit switches 32 and 33. Thus, the error gate 51 can be preset to a predetermined number of counts to indicate a fixed mechanical alignment error. If the heads are moving rapidly, decreasing the time between engagements of sensor 32 and 33, the increased pulse rate from generator 48 compensates for the decreased time. In other words, each pulse always corresponds to a fixed linear distance. In addition, it can be seen that the method for determining the time arrival of the gauging heads is purely digital.

The output of gate 51 can also easily be coupled to a computer where errors can be recorded and automatically corrected if this feature is desired.

As explained previously when the gauging heads 26 and 27 reach the extreme end of the beams 28 and 29 and operate the switches 32 and 33, the clock 11 will be stopped and the operation of the clock will not start again until another command is received on the computer control line 12. When this occurs, the clock 11 is again placed in operation and pulses of opposite polarity are provided by the stepper motor pulse encoder 19 and the stepper motor 22 is driven thereby in an opposite direction so that the gauging heads 26 and 27 are shifted to the left as viewed in the drawing.

This movement continues until the lower gauging head 27 actuates the lower limit sensor switch 34 mounted on the beam 29 to supply a signal to the stop gate 36 to again stop clock 11. This again stops the movement of the gauging heads 26 and 27.

At the same time the foregoing is taking place, a binary Coded Decimal (BCD) up/down counter 61 is provided which can count the pulses supplied to the stepper motor 22 or alternatively as shown in the drawing can count pulses supplied from a position feedback pulse generator 48 driven by the stepper motor 22 through a modulo divider 60. Divider 60 produces an output for a predetermined and selected number of input pulses from generator 48. Since each input pulse represents a certain linear distance of scanner movement the entire width or "slice" of the paper 25 can be broken into slice increments. Moreover, the width of these increments can be varied as desired by use of control **60*a* which determines the number of input counts to produce an output; alternately divider 60** may be computer controlled.

The BCD up/down counter 61 therefore keeps track of the exact position, as a function of slice increments, of the scanning heads 26 and 27 relative to the sheet being scanned. By the words up and down is meant the direction across the sheet with "up" being toward sensors 32 and 33 and "down" being toward lower sensor 34. Counter 61 is reset to zero by a "Zero Reset" line connected between the counter and lower sensor 34.

The BCD up/down counter is connected to a position display 62 to give a visual display 62 in terms of slice increments of the position of the gauging heads 26 and 27 at all times. In addition, the output lead from counter 61 labeled "Slice Position Interrupt Output" is coupled to the head or gauging means 26 and 27 activating irradiating means included in the head for each increment of the paper slice which is scanned. The Slice Position Interrupt Output lead would also be coupled to computer means (not shown) for any further desired system control.

Emergency off-sheet demand means are also provided for causing the stepper motor to move the heads 26 and 27 to either their lower or upper limits depending on which is closest to the scan head in its present position. This is accomplished by the BCD counter 61 in conjunction with OR gates 54 and 56 and AND gate 64 which has as its inputs the outputs of OR gates 54 and 56 and has its output coupled to start gate 13. A ganged switch 65 couples to one input of OR gates 54 and 56 signals from BCD counter 61 designated less than 50 percent slice and greater than 50 percent slice. Counter 61 has stored within its information as to the center slice increment. When the switch **11*a* coupled to clock 11 is moved to the EMR or emergency off-sheet demand position along with switch 65 which is moved to the same position counter 61 will have an output on the less than 50 percent line if the scanning heads are closer to the lower limit; that is, sensor 54. An output on the greater than 50 percent line is produced if the scanning heads 26 and 27 are closer to the upper limit. Thus, for example, if the latter case is true, an output on the greater than 50 percent line will energize OR gate 56 and thus cause stepper motor 22 to move in the up direction because of the signal on the input "up" line 58 of encoder 19. At the same time AND gate 64 is energized to start the scanning head in motion. It can also be seen that any arbitrary position other than 50 percent can be set into BCD up/down counter 61** to provide any preselected reversing point.

A second terminal of switch 65 labeled CC is for computer control of the up/down motion of the stepper motor. This can be utilized for added flexibility.

Lastly, a third position of switch 65 labeled "SP" is for moving the scanning heads 26 and 27 to a single point on sheet 25. When switch 65 is moved to this position, OR gates 54 and 56 are coupled to the output lines 67 and 69 of a logic gate 66. The logic gate has its inputs, an input "*A*" from counter 61 which indicates the incremental slice position at which the scanner is presently located and an input designated "B" which is from digitally coded position selector switch 63. Switch 63 can be set either manually or by computer to determine the single point at which the scanner heads 26 and 27 are to be moved.

Logic gate 66 is so arranged that when its two inputs are equal or the desired point is reached the condition of $A=B$ is indicated on line 68 which in turn is coupled to stop gate 36 to stop the scanner at the desired point. With A greater than B a signal on line 67 causes the scanning heads to move toward the lower limit and with A less than *B* a signal on line 69 moves the heads toward the upper limit.

Thus, the present invention provides a digital control system for scanning sheet material which has simplified logic means and provides for digital indication of head misalignment along with a position readout of the scanning head in terms of incremental slice position. Other features provided by the present invention are a simplified emergency off-sheet demand capability and movement to any single desired point in the scan.

I claim:

1. A digital control system for scanning sheet material one edge of said sheet being proximate to a lower scan limit and the other edge proximate to an upper scan limit, said system comprising; first and second scanning head means located in juxtaposition on opposed sides of said sheet material, motor means coupled to said head means for driving said head means across said sheet material at a predetermined speed, means coupled to said motor means having an output signal with a pulse-repetition rate proportional to said speed of said head means, fist and second limit sensor means for sensing the respective arrivals of said first and second scanning-head means at one of said lower and upper limits for producing respective indications of said arrivals, and counting means, driven at said pulse-repetition rate, and responsive to said arrival indication first in time to start to count and to said arrival indication last in time to stop whereby said count of said counter means represents the alignment error between said two head means.

2. A digital control system as in claim 1 including reference means for comparing said count with a preset reference count.

3. A digital control system as in claim 2 including warning means for indicating if said count exceeds said preset reference count.

4. A digital control system as in claim 1 including third limit sensor means for sensing the arrival of a scanning head means at one of said limits for reversing the direction of scan across said sheet material.

5. A digital control system for scanning sheet material one edge of said sheet being proximate to a lower scan limit and the other edge proximate to an upper scan limit, said system comprising; first and second scanning head means located in juxtaposition to said sheet material, motor means coupled to said head means for driving said head means across said sheet material at a predetermined speed, means coupled to said motor having an output signal with a pulse-repetition rate proportional to said speed of said head means, modulo-divider means for incrementing the linear distance between said upper and lower scan limits into a predetermined number of increments, and means coupled to and responsive to said modulo divider means for indicating the increment of said sheet material being scanned by said head means.

6. A digital control system as in claim 5 in which said head means includes means for irradiating said sheet material and including means for coupling said increment-indicating means to said head means for activating said irradiating means for each increment.

7. A digital control system as in claim 5 including emergency off-sheet demand means for causing said motor means to move said head means to one of said limits including means coupled to said increment-indicating means for causing said head means to move toward the closest one of said scan limits.

8. A digital control system as in claim 5 including selector switch means coupled to said increment-indicating means for causing said motor to drive said head means to a single increment as selected by said selector switch means.